(12) United States Patent
Chen et al.

(10) Patent No.: US 12,512,757 B2
(45) Date of Patent: Dec. 30, 2025

(54) POWER SUPPLY CIRCUIT WITH POWER SUPPLY RAILS INDEPENDENTLY MONITORED FOR LOAD ATTACKS

(71) Applicant: QUALCOMM Incorporated, San Diego, CA (US)

(72) Inventors: Jiwei Chen, San Jose, CA (US);
Guoyong Guo, San Jose, CA (US);
Jonathan Luty, San Diego, CA (US);
Xinying Ding, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 18/439,299

(22) Filed: Feb. 12, 2024

(65) Prior Publication Data

US 2025/0260320 A1    Aug. 14, 2025

(51) Int. Cl.
*H02M 3/158* (2006.01)
*G06F 1/26* (2006.01)
(Continued)

(52) U.S. Cl.
CPC ............ *H02M 3/158* (2013.01); *G06F 1/263* (2013.01); *H02J 1/10* (2013.01); *H02J 1/102* (2013.01); *H02J 7/0063* (2013.01); *H02M 1/0009* (2021.05); *H02J 2207/20* (2020.01); *H03K 19/20* (2013.01)

(58) Field of Classification Search
CPC .......... H02J 1/10; H02J 1/106; H02J 2207/20; H02J 7/0068; H02J 7/007182; H02J 7/00; H02J 7/0063; H02M 3/158; G06F 1/263; G06F 1/26
See application file for complete search history.

(56) References Cited

U.S. PATENT DOCUMENTS 10,778,026 B2 * 9/2020 Langlinais ................ H02J 7/00
11,606,031 B1   3/2023 Oporta
(Continued)

FOREIGN PATENT DOCUMENTS

CN        104300509 A     1/2015
WO      2022159927 A1    7/2022

OTHER PUBLICATIONS

International Search Report and Written Opinion—PCT/US2025/011115—ISA/EPO—May 2, 2025.

*Primary Examiner* — Ryan Johnson
(74) *Attorney, Agent, or Firm* — Patterson + Sheridan, L.L.P.

(57) ABSTRACT

Certain aspects of the present disclosure provide techniques and apparatus for supplying power. One example power supply circuit generally includes a switching regulator including an output coupled to a first power supply rail for coupling to a first load and to a second power supply rail for coupling to a second load, a battery node for coupling to a battery, a switch coupled between the battery node and the second power supply rail, and a logic circuit including a first input coupled to the first power supply rail, a second input coupled to the second power supply rail, and an output coupled to a control input of the switch, the logic circuit being configured to control closing of the switch when a voltage of the first power supply rail falls below a first threshold voltage or a voltage of the second power supply rail falls below a second threshold voltage.

18 Claims, 6 Drawing Sheets

(51) Int. Cl.
*H02J 1/10* (2006.01)
*H02J 7/00* (2006.01)
*H02M 1/00* (2007.01)
*H03K 19/20* (2006.01)

(56) References Cited

U.S. PATENT DOCUMENTS

| | | |
|---|---|---|
| 12,199,458 B2 | 1/2025 | Kun et al. |
| 2005/0213356 A1 | 9/2005 | Yanagida et al. |
| 2006/0006850 A1* | 1/2006 | Inoue ................ H02J 7/007182 323/265 |
| 2008/0054855 A1* | 3/2008 | Hussain ................ H02J 7/0068 320/162 |
| 2009/0040794 A1 | 2/2009 | Williams |
| 2011/0163601 A1* | 7/2011 | Li ............................ H02J 7/02 307/48 |
| 2020/0395848 A1 | 12/2020 | Guo et al. |
| 2021/0273475 A1* | 9/2021 | Qiu .................. H02J 7/007192 |
| 2022/0231518 A1* | 7/2022 | Kun ........................ H02M 3/07 |
| 2023/0142751 A1 | 5/2023 | Cho et al. |

\* cited by examiner

POWER SUPPLY CIRCUIT WITH POWER SUPPLY RAILS INDEPENDENTLY MONITORED FOR LOAD ATTACKS

TECHNICAL FIELD

Certain aspects of the present disclosure generally relate to power supply circuits and, more particularly, to techniques and apparatus for independently monitoring individual power supply rails for load attacks and taking corrective action.

BACKGROUND

A voltage regulator ideally provides a constant direct current (DC) output voltage regardless of changes in load current or input voltage. Voltage regulators may be classified as linear regulators or switching regulators. While linear regulators tend to be relatively compact, many applications may benefit from the increased efficiency of a switching regulator. A linear regulator may be implemented by a low-dropout (LDO) regulator, for example. A switching regulator (also known as a "switching converter" or "switcher") may be implemented, for example, by a switched-mode power supply (SMPS), such as a buck converter, a boost converter, a buck-boost converter, or a charge pump.

For example, a buck converter is a type of SMPS typically comprising: (1) a high-side switch coupled between a relatively higher voltage rail and a switching node, (2) a low-side switch coupled between the switching node and a relatively lower voltage rail, (3) and an inductor coupled between the switching node and a load (e.g., represented by a shunt capacitive element). The high-side and low-side switches are typically implemented with transistors, although the low-side switch may alternatively be implemented with a diode.

A charge pump is a type of SMPS typically comprising at least one switching device to control the connection of a supply voltage across a load through a capacitor. In a voltage doubler (also referred to as a "multiply-by-two (X2) charge pump"), for example, the capacitor of the charge pump circuit may initially be connected across the supply, charging the capacitor to the supply voltage. The charge pump circuit may then be reconfigured to connect the capacitor in series with the supply and the load, doubling the voltage across the load. This two-stage cycle is repeated at the switching frequency for the charge pump. Charge pumps may be used to multiply or divide voltages by integer or fractional amounts, depending on the circuit topology.

Power management integrated circuits (power management ICs or PMICs) are used for managing the power scheme of a host system and may include and/or control one or more voltage regulators (e.g., buck converters or charge pumps). A PMIC may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features are discussed briefly below. After considering this discussion, and particularly after reading the section entitled "Detailed Description," one will understand how the features of this disclosure provide the advantages described herein.

Certain aspects of the present disclosure provide a power supply circuit. The power supply circuit generally includes a switching regulator including an output coupled to a first power supply rail for coupling to a first load, the output being further coupled to a second power supply rail for coupling to a second load; a battery node for coupling to a battery; a switch coupled between the battery node and the second power supply rail; a control circuit including an output coupled to a control input of the switch; a first comparator including a first input coupled to the first power supply rail and a second input coupled to a first reference voltage node, the first comparator further including an output coupled to an input of the control circuit; and a second comparator including a first input coupled to the second power supply rail and a second input coupled to a second reference voltage node, the second comparator further including an output coupled to the input of the control circuit.

Certain aspects of the present disclosure are directed to a power supply circuit. The power supply circuit generally includes: a switching regulator including an output coupled to a first power supply rail for coupling to a first load, the output being further coupled to a second power supply rail for coupling to a second load; a battery node for coupling to a battery; a switch coupled between the battery node and the second power supply rail; and a logic circuit including a first input coupled to the first power supply rail, a second input coupled to the second power supply rail, and an output coupled to a control input of the switch, the logic circuit being configured to control closing of the switch when a voltage of the first power supply rail falls below a first threshold voltage or when a voltage of the second power supply rail falls below a second threshold voltage.

Certain aspects of the present disclosure provide an integrated circuit. The integrated circuit generally includes a power supply circuit described herein.

Certain aspects of the present disclosure are directed to a device. The device generally includes a switching regulator including an output coupled to a first power supply rail for coupling to a first load, the output being further coupled to a second power supply rail for coupling to a second load; a battery coupled to a battery node; a switch coupled between the battery node and the second power supply rail; a control circuit including an output coupled to a control input of the switch; a first comparator including a first input coupled to the first power supply rail and a second input coupled to a first reference voltage node, the first comparator further including an output coupled to an input of the control circuit; and a second comparator including a first input coupled to the second power supply rail and a second input coupled to a second reference voltage node, the second comparator further including an output coupled to the input of the control circuit.

Certain aspects of the present disclosure provide a device. The device generally includes a switching regulator including an output coupled to a first power supply rail for coupling to a first load, the output being further coupled to a second power supply rail for coupling to a second load; a battery coupled to a battery node; a switch coupled between the battery node and the second power supply rail; and a logic circuit including a first input coupled to the first power supply rail, a second input coupled to the second power supply rail, and an output coupled to a control input of the switch, the logic circuit being configured to control closing of the switch when a voltage of the first power supply rail falls below a first threshold voltage or when a voltage of the second power supply rail falls below a second threshold voltage.

Certain aspects of the present disclosure are directed to a method of supplying power. The method generally includes monitoring a voltage of a first power supply rail and a voltage of a second power supply rail; determining that the monitored voltage of the first power supply rail is below a first threshold voltage or that the monitored voltage of the second power supply rail is below a second threshold voltage; and in response to the determination, controlling closing of a switch coupled between the second power supply rail and a battery node coupled to the battery.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
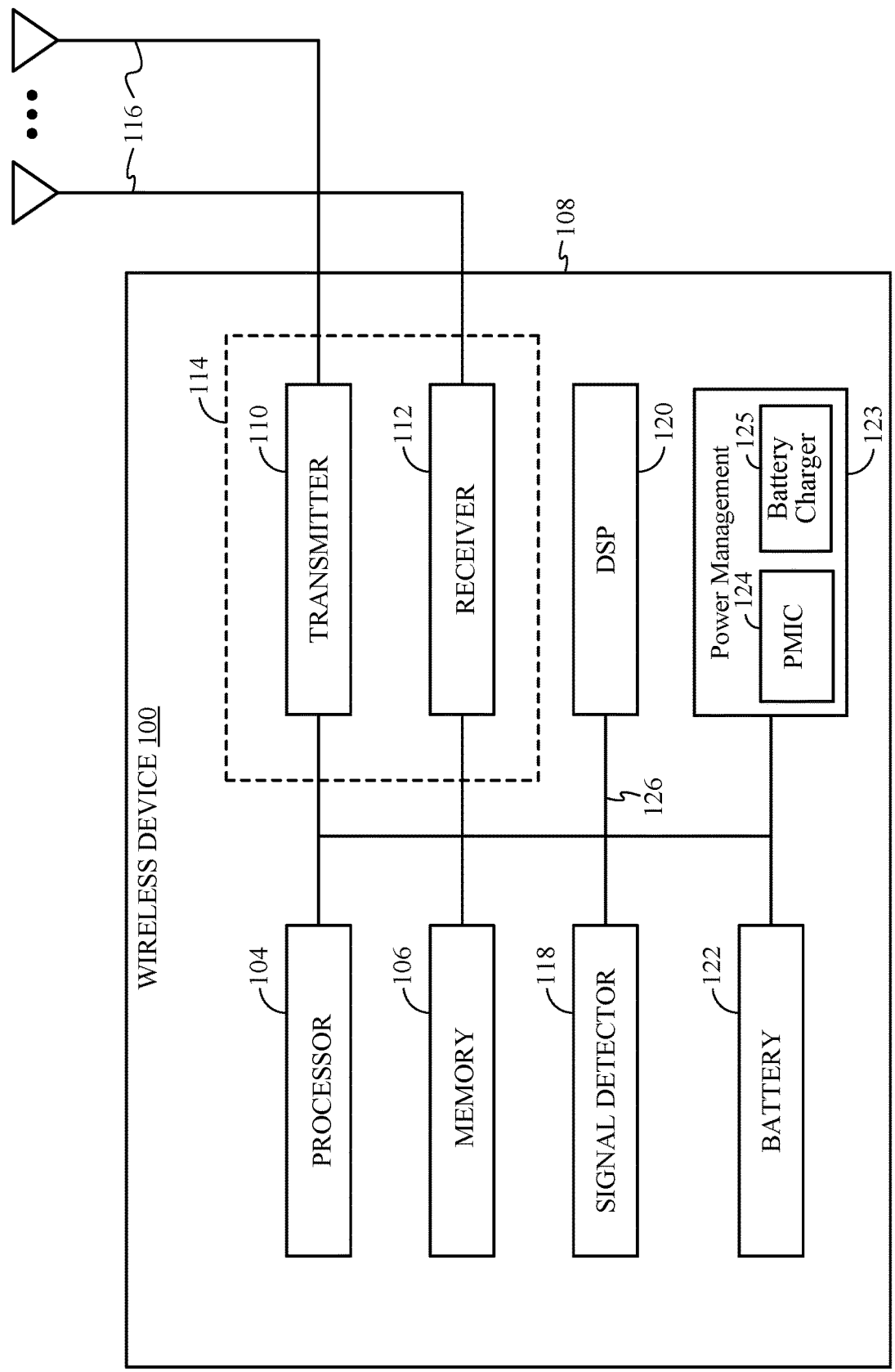
FIG. 1 is a block diagram of an example device comprising a power management system that includes a power management integrated circuit (PMIC) and a battery charging circuit, in which aspects of the present disclosure may be practiced.

Certain aspects of the present disclosure provide techniques and apparatus for monitoring supply rails of a power supply circuit for load attacks and enabling a battery supplemental mode to compensate for, or at least assist with, a detected power supply voltage dip due to a load attack. The power supply circuit may include a first comparator for monitoring a voltage of a first power supply rail of the power supply circuit and a second comparator for monitoring a voltage of a second power rail of the power supply circuit. The first comparator compares the voltage of the first power supply rail to a voltage at a first reference voltage node, and the second comparator compares the voltage of the second power supply rail to a voltage at a second reference voltage node. The voltage at the second reference voltage node is different from the voltage at the first reference node.

When the first comparator detects the voltage at the first power supply rail is less than the voltage at the first reference voltage node or the second comparator detects the voltage at the second power supply rail is less than the voltage at the second reference voltage node, the power supply circuit may enter a battery supplemental mode. In the battery supplemental mode, a switch coupled between the second power supply rail and a battery node for coupling to a battery closes to provide an electrical path (e.g., a discharge path) between the battery and the second power supply rail. In this manner, a discharge current the battery provides to the second power supply rail may compensate for, or at least assist with, a voltage dip due to a load attack occurring on the second power supply rail or the first power supply rail such that the voltages of the first power supply rail and the second power supply rail are increased (e.g., to be above the voltage at the corresponding reference voltage node). By independently monitoring the first power supply rail and the second power supply rail for a significant voltage drop and enabling the battery supplemental mode in response to detecting such a drop, an amount of time the voltage of either power supply rail is below the voltage at the corresponding reference voltage node can be minimized, or at least reduced. This is beneficial because the longer the voltage of the first power supply rail is below the voltage at the first reference voltage node and/or the voltage at the second power supply rail is below the voltage at the second reference voltage node, the higher the likelihood is that components powered by the first power supply rail or the second power supply rail may be adversely affected by the load attack.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in any of various suitable apparatus, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDAs), and the like.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, an Internet of things (IoT) device, a wearable device, etc. For certain aspects, the device 100 may be a foldable device (e.g., a flip phone).

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122, which may be used to power the various components of the device 100 (e.g., when another power source—such as a wall adapter or a wireless power charger—is unavailable). The battery 122 may comprise a single cell or multiple cells connected in series and/or in parallel. The device 100 may further include additional independent batteries (not shown). Each of the additional independent batteries may comprise a single cell or multiple cells connected in series and/or in parallel.

The device 100 may also include a power management system 123 for managing the power from the battery 122 (or batteries), a wall adapter, and/or a wireless power charger to the various components of the device 100. The power management system 123 may perform a variety of functions for the device such as DC-to-DC conversion, battery charging, power-source selection, voltage scaling, power sequencing, source mode power, etc. In certain aspects, the power management system 123 may include a power management integrated circuit (power management IC or PMIC) 124 and one or more power supply circuits, such as a battery charger 125, which may be controlled by the PMIC or logic associated with the battery charger, for example. For certain aspects, at least a portion of one or more of the power supply circuits (e.g., at least a portion of the battery charger 125) may be integrated in the PMIC 124. The PMIC 124 and/or the one or more power supply circuits may include at least a portion of a switched-mode power supply (SMPS) circuit, which may be implemented by any of various suitable switched-mode power supply circuit topologies, such as a two-level buck converter, a three-level buck converter, a charge pump, or an adaptive combination power supply circuit (e.g., the SMPS circuit 214 of FIG. 2), which can switch between operating in a buck converter mode and a charge pump mode, as described below.

The various components of the device 100 may be coupled together by a bus system 126, which may include a power bus, a control signal bus, and/or a status signal bus in addition to a data bus. Additionally or alternatively, various combinations of the components of the device 100 may be coupled together by one or more other suitable techniques.

Example Power Supply Circuit and Operation

As described above, the PMIC 124 and/or the one or more power supply circuits (e.g., battery charger 125) may include at least a portion of an SMPS circuit (e.g., a buck converter, a charge pump converter, or an adaptive combination power supply circuit capable of switching therebetween), which may be a single-phase or multi-phase converter. In the case of an adaptive combination power supply circuit, both converter modes may be single-phase, both converter modes may be multi-phase, one converter mode may be single-phase while the other converter mode is multi-phase or capable of changing between single-phase and multi-phase, or one converter mode may be multi-phase while the other converter mode is capable of changing between single-phase and multi-phase.

Figure 2:
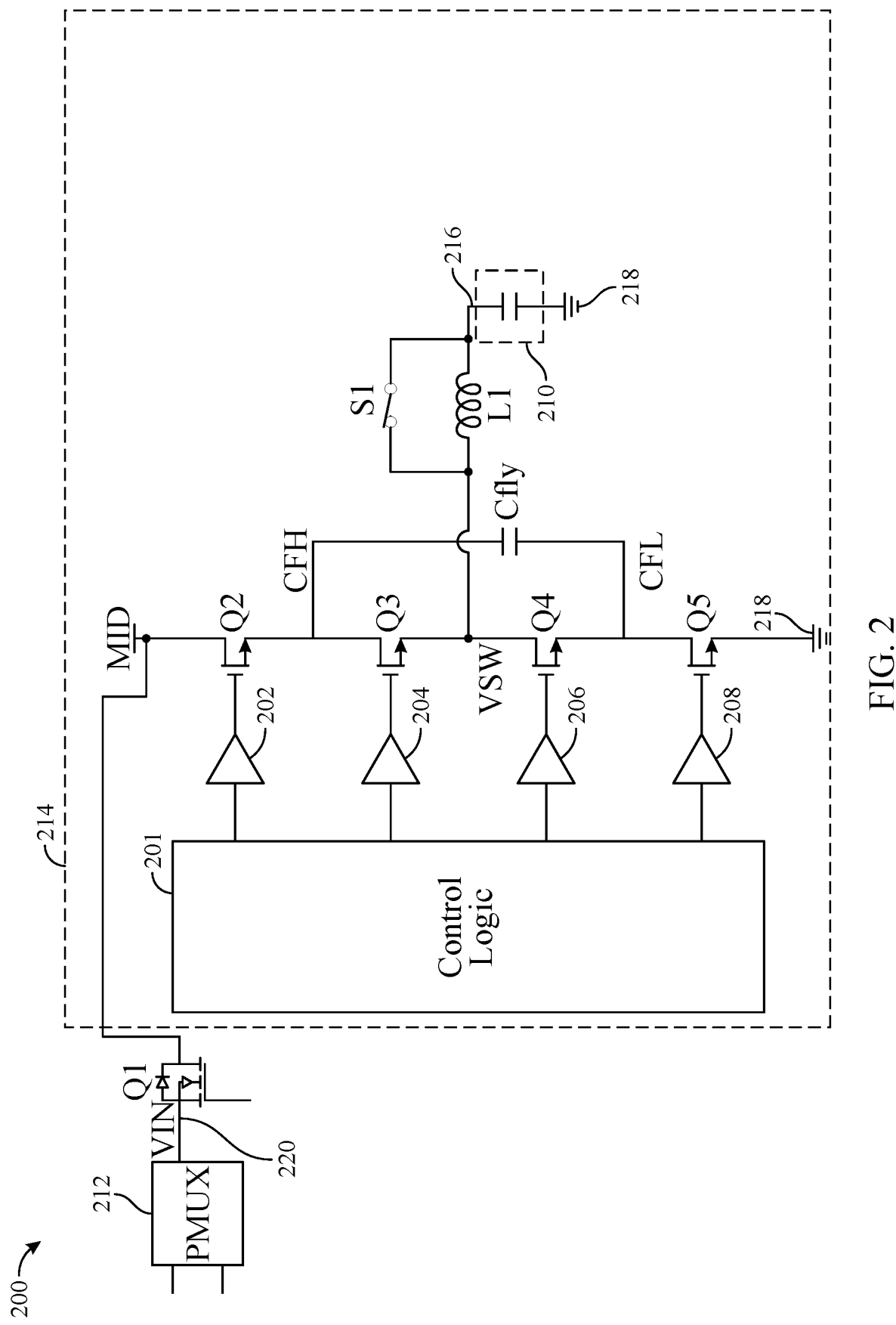
FIG. 2 is a circuit diagram of an example power supply circuit, in accordance with certain aspects of the present disclosure.

FIG. 2 is a circuit diagram of an example power supply circuit 200, which may be used to charge one or more batteries. As illustrated, the power supply circuit 200 includes a power multiplexer 212 (labeled "PMUX"), a reverse-current-blocking transistor Q1 (which may also be referred to as an overvoltage protection (OVP) field-effect transistor (FET) or an input FET), and an SMPS circuit 214 (e.g., an adaptive SMPS circuit).

The power multiplexer 212 may be configured to select between receiving power from, for example, (i) a Universal Serial Bus (USB) port for connecting to a wall adapter and (ii) a wireless power port (both not shown). The power multiplexer 212 may be implemented as a single-pole, double-throw (SPDT) switch by two OVP FETs, and in this case, transistor Q1 may be eliminated.

In certain aspects, the output of the power multiplexer 212 may be coupled to an input voltage node 220 (labeled "VIN"). The input voltage node 220 may be coupled to a source of the transistor Q1, and a drain of the transistor Q1 may be coupled to a voltage node (labeled "MID") of the SMPS circuit 214. The MID voltage node may serve as the power supply rail of the SMPS circuit 214, and in some cases, may alternatively be considered as an input node of the SMPS circuit. In some cases, the power multiplexer 212 and/or transistor Q1 may be removed.

For certain aspects, the SMPS circuit 214 may have a two-level buck converter topology. For other aspects, the SMPS circuit 214 may have a single-phase three-level buck converter topology (as illustrated in the power supply circuit 200 of FIG. 2), and may include a second transistor Q2, a third transistor Q3, a fourth transistor Q4, a fifth transistor Q5, a flying capacitive element Cfly, an inductive element L1, and a load 210 (e.g., represented as by a capacitor). For other aspects, the SMPS circuit 214 may have a dual-phase three-level buck converter topology. To realize an adaptive SMPS circuit, a switch S1 may be added across the inductive element L1 of the three-level buck converter topology. With the switch S1 closed, the adaptive SMPS circuit may function as a single-phase divide-by-two (Div2) charge pump converter, as further described below. In certain aspects, switch S1 may be implemented by two back-to-back transistors.

Transistor Q3 may be coupled to transistor Q2 via a first node (labeled "CFH" for flying capacitor high node), transistor Q4 may be coupled to transistor Q3 via a second node (labeled "VSW" for voltage switching node), and transistor Q5 may be coupled to transistor Q4 via a third node (labeled "CFL" for flying capacitor low node). For certain aspects, the transistors Q2-Q5 may be implemented as n-type metal-oxide-semiconductor (NMOS) transistors, as illustrated in FIG. 2. In this case, the drain of transistor Q3 may be coupled to the source of transistor Q2, the drain of transistor Q4 may be coupled to the source of transistor Q3, and the drain of transistor Q5 may be coupled to the source of transistor Q4. The source of transistor Q5 may be coupled to a reference potential node 218 (e.g., electric ground) for the power supply circuit 200. The flying capacitive element Cfly may have a first terminal coupled to the first node and a second terminal coupled to the third node. The inductive element L1 may have a first terminal coupled to the second node and a second terminal coupled to an output voltage node 216 (labeled "VOUT," which may also be referred to as "VPH_PWR" or "VPH") and the load 210.

Control logic 201 may control operation of the SMPS circuit 214 and other aspects of the power supply circuit 200. For example, the control logic 201 may control operation of the transistors Q2-Q5 via output signals to the inputs of respective gate drivers 202, 204, 206, and 208. The outputs of the gate drivers 202, 204, 206, and 208 are coupled to respective gates of transistors Q2-Q5. During operation of the adaptive SMPS circuit (or of a three-level buck converter), the control logic 201 may cycle through four different phases, which may differ depending on whether the duty cycle is less than 50% or greater than 50%.

Operation of the adaptive SMPS circuit with a duty cycle of less than 50% is described first. In a first phase (referred to as a "charging phase"), transistors Q2 and Q4 are activated, and transistors Q3 and Q5 are deactivated, to charge the flying capacitive element Cfly and to energize the inductive element L1. In a second phase (called a "holding phase"), transistor Q2 is deactivated, and transistor Q5 is activated, such that the VSW node is coupled to the reference potential node, the flying capacitive element Cfly is disconnected (e.g., one of the Cfly terminals is floating), and the inductive element L1 is deenergized. In a third phase (referred to as a "discharging phase"), transistors Q3 and Q5 are activated, and transistor Q4 is deactivated, to discharge the flying capacitive element Cfly and to energize the inductive element L1. In a fourth phase (also referred to as a "holding phase"), transistor Q4 is activated, and transistor Q3 is deactivated, such that the flying capacitive element Cfly is disconnected and the inductive element L1 is deenergized.

Operation of the adaptive SMPS circuit with a duty cycle greater than 50% is similar in the first and third phases, with the same transistor configurations. However, in the second phase (called a "holding phase") following the first phase, transistor Q4 is deactivated, and transistor Q3 is activated, such that the VSW node is coupled to the MID node, the flying capacitive element Cfly is disconnected, and the inductive element L1 is energized. Similarly in the fourth phase (also referred to as a "holding phase") with a duty cycle greater than 50%, transistor Q2 is activated, and transistor Q5 is deactivated, such that the flying capacitive element Cfly is disconnected and the inductive element L1 is energized.

Furthermore, the control logic 201 may have a control signal (not shown in FIG. 2) configured to control operation of switch S1 and selectively enable divide-by-two (Div2) charge pump operation. For certain aspects, when this control signal is logic low, switch S1 is open, and the power supply circuit 200 operates as a three-level buck converter using the inductive element L1. When this control signal is logic high for certain aspects, switch S1 is closed, thereby shorting across the inductive element L1 and effectively removing the inductive element L1 from the circuit, such that the adaptive SMPS circuit operates as a Div2 charge pump. The control logic 201 may be configured to automatically control operation of switch S1 (e.g., through the logic level of the control signal) based on an output current (also referred to as a "load current") and/or an input current for the adaptive SMPS circuit.

Example Power Supply Circuit With Multiple Power Supply Rails

Figure 3:
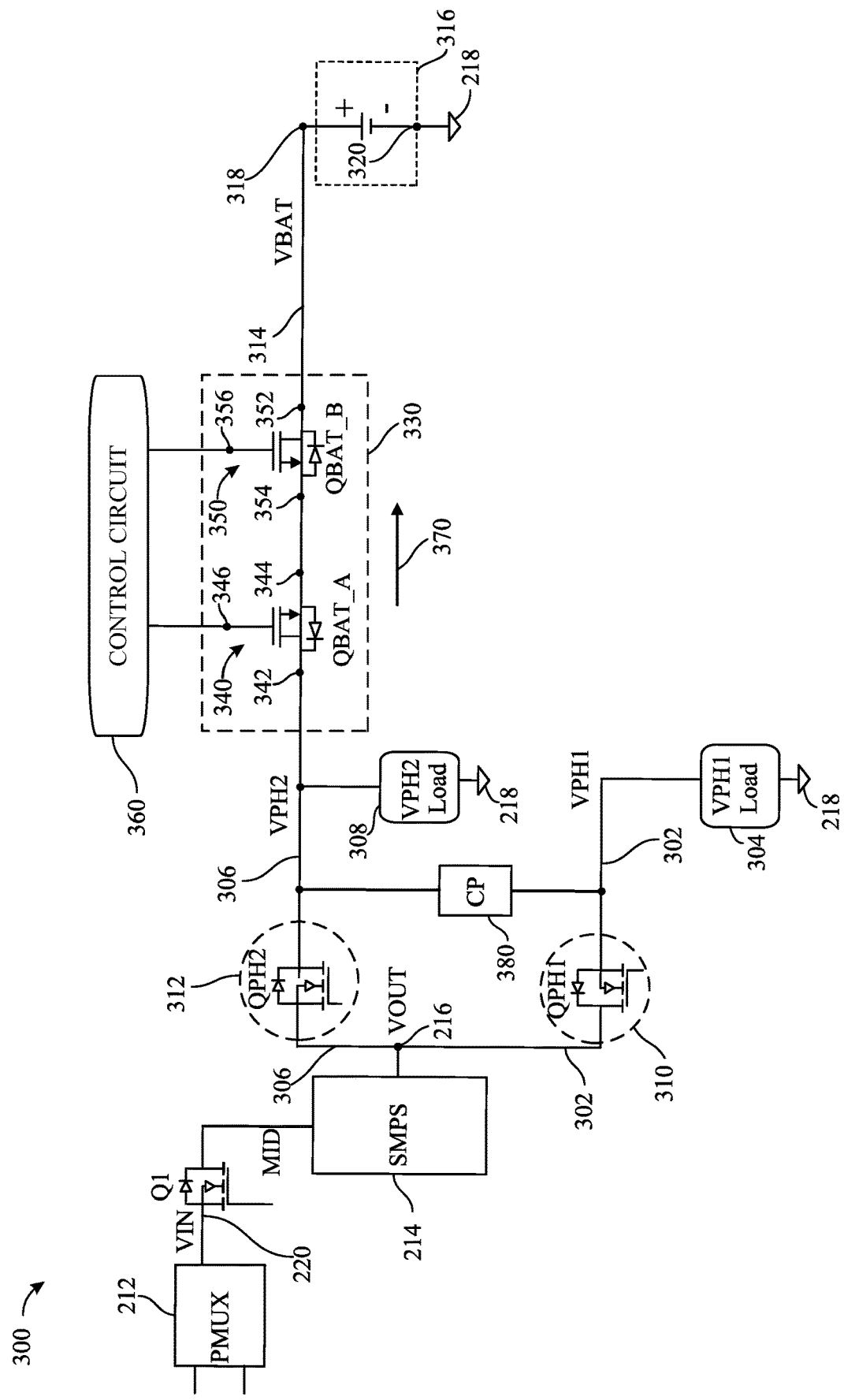
FIG. 3 is a circuit diagram of an example power supply circuit, in accordance with certain aspects of the present disclosure.

FIG. 3 is a circuit diagram of a power supply circuit 300 according to certain aspects of the present disclosure. The power supply circuit 300 may include the multiplexer 212, the transistor Q1, and the SMPS circuit 214 (or another suitable SMPS circuit) as described with respect to FIG. 2. The output voltage node 216 of the SMPS circuit 214 may be coupled to a first power supply rail 302 (labeled "VPH1") for coupling to a first load 304 (labeled "VPH1 Load"). The output voltage node 216 of the SMPS circuit 214 may be further coupled to a second power supply rail 306 (labeled "VPH2") for coupling to a second load 308 (labeled "VPH2 load").

In some instances, the output voltage node 216 of the SMPS circuit 214 may be selectively coupled to the first power supply rail VPH1 and the first load VPH1 via a first switch 310 (labeled as "QPH1"). In addition, the output voltage node 216 of the SMPS circuit 214 may be selectively coupled to the second power supply rail VPH2 and the second load VPH2 via a second switch 312 (labeled as "QPH2"). The first switch 310 and the second switch 312 may each be implemented with one or more transistors. In some cases, the first switch 310 and/or the second switch 312 may be implemented by back-to-back transistors or a body-switchable transistor, for example.

The power supply circuit 300 may include a battery node 314 (labeled "VBAT" for coupling to a battery 316. In some instances, the battery 316 may be a two-cell-in-series (2S) battery in a single package, but the battery 316 may include more than two cells in series in other instances. As shown, the battery 316 includes a first terminal 318 (e.g., positive electrode) for coupling the battery 316 to the battery node 314. The battery 316 further includes a second terminal 320 (e.g., negative electrode) for coupling to the reference potential node 218.

The power supply circuit 300 may include a switch 330 coupled between the second power supply rail VPH2 and the battery node VBAT. In some instances, the switch 330 may include a first transistor 340 (labeled "QBAT_A") and a second transistor 350 (labeled "QBAT_B"). The first transistor QBAT_A may include a drain 342 coupled to the second power supply rail VPH2. The second transistor QBAT_B may include a drain 352 coupled to the battery node VBAT and a source 354 coupled to a source 344 of the first transistor QBAT_A.

The power supply circuit 300 may include a control circuit 360 for controlling operation of the switch 330. In certain aspects, the control circuit 360 may include an output coupled to a control input of the switch 330. For example, the output(s) of the control circuit 360 may be coupled to a gate 346 of the first transistor QBAT_A and a gate 356 of the second transistor QBAT_B. In this manner, the control circuit 360 may control operation of the switch 330 by controlling a gate voltage at the first transistor QBAT_A and a gate voltage at the second transistor QBAT_B.

According to certain aspects, the power supply circuit 300 may perform charging (e.g., via the SMPS circuit 214) of the battery 316 through a controlled charging path 370. Electrical power received from a wall adapter or wireless charger, for example, at the power multiplexer 212 may be converted by the SMPS circuit 214 and used to independently charge the battery 316 (e.g., through charging path 370). For example, current from the output voltage node 216 may be routed to the battery 316 (e.g., the first terminal 318 thereof) via the switch 330 in the charging path 370, for charging the battery 316. Having the switch 330 in the charging path 370 may allow for charging control of the battery 316, including trickle pre-charge, constant current (CC), constant voltage (CV), and/or termination charging.

The power supply circuit 300 may include a charge pump 380 (labeled "CP") for generating multiple voltage domains (e.g., the first power supply rail VPH1 and the second power supply rail VPH2). The CP 380 may be implemented as an X2 charge pump, a multiply-by-four (X4) charge pump, a Div2 charge pump, a divide-by-four (Div4) charge pump, or a charge pump with any other suitable voltage conversion. The CP 380 may be considered as an X2D2 charge pump when operated as an X2 charge pump in one direction and as a Div2 charge pump in the opposite direction.

The CP 380 may have a first terminal coupled to the first switch 310 and the first power supply rail VPH1. The CP 380 may further include a second terminal coupled to the second switch 312 and the second power supply rail VPH2. In a first direction, the CP 380 may be configured to generate the second power supply rail VPH2 from the first power supply rail VPH1 and supply the load 308. In a second direction, the CP 380 may be configured to generate the first power supply rail VPH1 from the second power supply rail VPH2 and supply the load 304.

For example, the CP 380 may multiply voltage in the first direction (e.g., operate as an X2 charge pump), and may divide voltage in the second direction (e.g., operate as a Div2 charge pump), or vice versa. In some aspects, the second power supply rail VPH2 has a higher voltage than the first power supply rail VPH1. For example, the CP 380 may double the voltage at the first power supply rail VPH1 to generate the voltage at the second power supply rail VPH2. In this manner, the power supply circuit 300 may supply both a power supply rail in a relatively low voltage domain (e.g., the first power supply rail VPH1) and a power supply rail in a relatively high voltage domain (e.g., the second power supply rail VPH2).

In some instances, the switch 330 may be open (e.g., the transistors QBAT_A and QBAT_B may be turned off) or, alternatively, may be controlled (e.g., via the control circuit 360) such that the transistors implementing the switch 330 are in a low-power mode (e.g., weakly on). Such instances may include, for example, when the battery 316 is fully charged or charging of the battery 316 is disabled. Such instances may further include when the battery is in a particular mode, such as a pre-charge mode or a linear-fast-charge mode.

When the transistors implementing the switch 330 are off or in the low-power mode, the SMPS circuit 214 may provide power to the first power supply rail VPH1 and the second power supply rail VPH2. In particular, the SMPS circuit 214 may provide an output current to the first power supply rail VPH1 and the second power supply rail VPH2 via the first switch 310 and the second switch 312, respectively.

In some instances, the first power supply rail VPH1 or the second power supply rail VPH2 experiences a load attack in which the VPH1 load or the VPH2 load suddenly demands a current that exceeds (e.g., is greater than) the limited output current of the SMPS circuit 214. The load attack may cause a voltage of the first power supply rail VPH1 and the second power supply rail VPH2 to drop. If the voltage of the first power supply rail VPH1 or the voltage of the second power supply rail VPH2 drops significantly, components of the respective loads 304, 308 coupled thereto may be affected. For example, the voltage of the first power supply rail VPH1 dropping below a particular voltage may cause certain components of the VPH1 load coupled to the first power supply rail VPH1 to reset, work improperly, or be harmed. Likewise, the voltage of the second power supply rail VPH2 dropping below a particular voltage may cause certain components of the VPH2 load coupled to the second power supply rail VPH2 to reset, work improperly, or be harmed.

Example Power Supply Circuit Having Multiple Independently Monitored Power Supply Rails In an effort to compensate for the load attack, the power supply circuit 300 may be configured to operate in a battery supplemental mode during which the switch 330 (e.g., first transistor QBAT_A and second transistor QBAT_2) of the power supply circuit 300 is controlled to allow the battery 316 to provide current (e.g., a discharge current) to the second power supply rail VPH2 (and consequently to the first power supply rail VPH1 via the CP 380). In this manner, the power supply circuit 300, when operating in the battery supplemental mode, can reverse a dip in a voltage of the first power supply rail VPH1 or the second power supply rail VPH2 (e.g., due to a load attack) and increase this voltage above a first threshold voltage or above a second threshold voltage, respectively.

Figure 4:
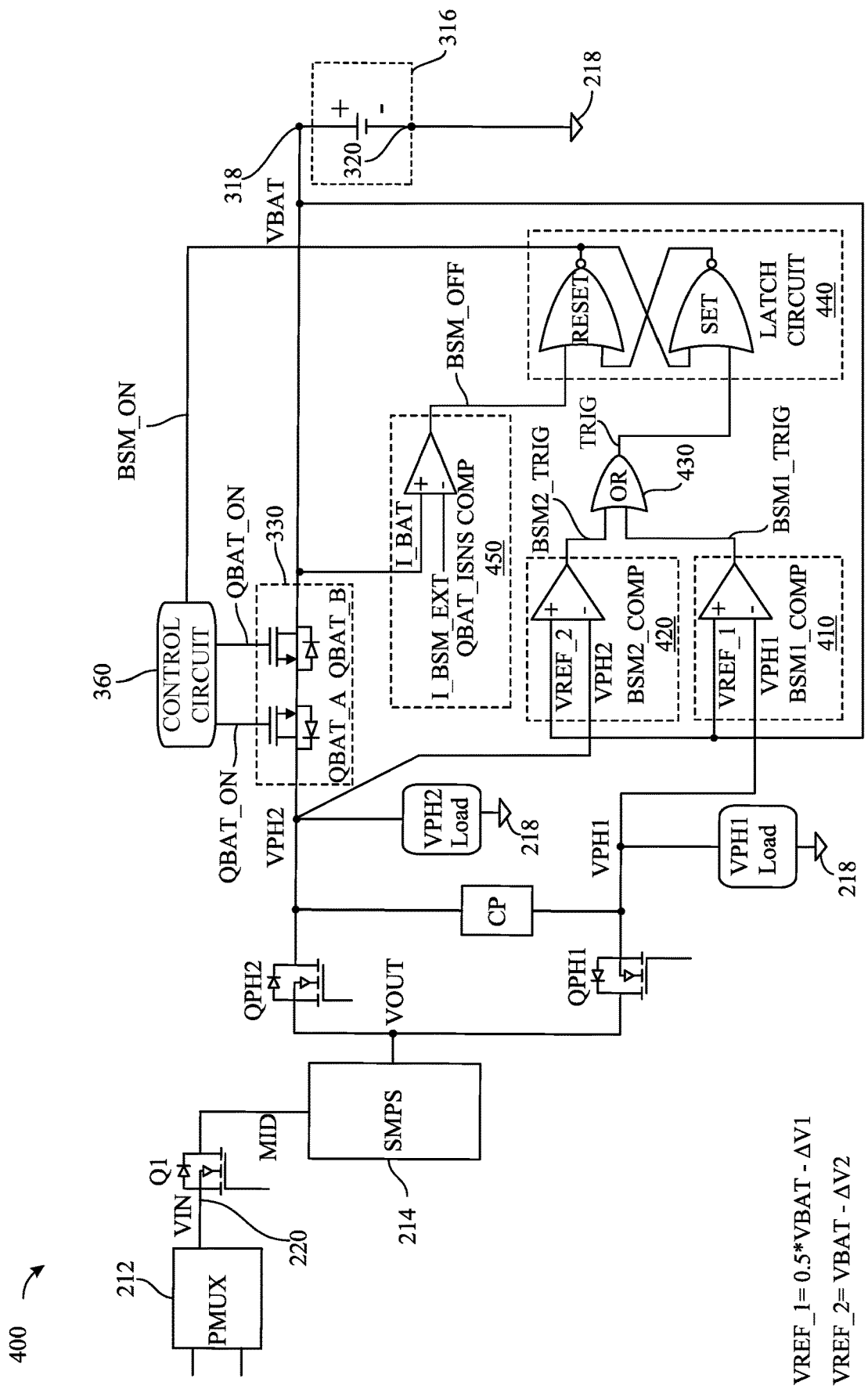
FIG. 4 is a circuit diagram of an example power supply circuit including logic for independently monitoring voltages of multiple power supply rails for load attacks, in accordance with certain aspects of the present disclosure.

FIG. 4 illustrates a circuit diagram of a power supply circuit 400, in accordance with certain aspects of the present disclosure. The power supply circuit 400 adds logic to the power supply circuit 300 of FIG. 3 for monitoring the voltages of the power supply rails VPH1 and VPH2 and outputting a control signal to the control circuit 360 for controlling operation of the switch 330 in response to determining that at least one of the monitored voltages is below a respective threshold voltage. As illustrated in FIG. 4, the logic may include dedicated comparators for detecting a load attack on the first power supply rail VPH1 or the second power supply rail VPH1. For instance, the power supply circuit 400 includes a first comparator 410 (labeled "BSM1_COMP") for detecting a load attack on the first power supply rail VPH1 and a second comparator 420 (labeled "BSM2_COMP") for detecting a load attack on the second power supply rail VPH2.

The first comparator 410 includes a first input (e.g., labeled "−") coupled to the first power supply rail VPH1 and a second input (e.g., labeled "+") coupled to a first reference voltage node (labeled "VREF_1"). In some instances, a voltage at the first reference voltage node VREF_1 is one-half of a battery voltage ($V_{BAT}$) of the battery 316 minus a first voltage drop ΔV1. In some instances, the first voltage drop ΔV1 is generated by a current * resistance (IR) drop across a circuit component, such as by a voltage divider (not shown).

The first comparator 410 is configured to compare the voltage of the first power supply rail VPH1 versus the voltage at the first reference voltage node VREF_1. If the voltage of the first power supply rail VPH1 falls below (e.g., is less than) the voltage at the first reference voltage node VREF_1, a logic level of a first digital signal (e.g., labeled as "BSM1_TRIG") output by the first comparator 410 changes from a first logic level (e.g., a zero) to a second logic level (e.g., a one).

The second comparator 420 includes a first input (e.g., labeled "−") coupled to the second power supply rail VPH2 and a second input (e.g., labeled "+") coupled to a second reference voltage node (labeled "VREF_2"). In some instances, a voltage at the second reference voltage node VREF_2 is the battery voltage of the battery 316 minus a second voltage drop ΔV2. In some instances, the second voltage drop ΔV2 is generated by a current * resistance (IR) drop across a circuit component, such as a resistive element.

The second comparator 420 is configured to compare the voltage of the second power supply rail VPH2 versus the voltage at the second reference voltage node VREF_2. If the voltage of the second power supply rail VPH2 falls below (e.g., is less than) the voltage at the second reference voltage node VREF_2, a logic level of a second digital signal (e.g., labeled as "BSM2_TRIG") output by the second comparator 420 changes from the first logic level (e.g., a zero) to the second logic level (e.g., a one).

The first digital signal BSM1_TRIG or the second digital signal BSM2_TRIG changing from the first logic level (e.g., zero) to the second logic level (e.g., one) indicating the occurrence of a voltage dip (e.g., due to a load attack) on the first power supply rail VPH1 or the second power supply rail VPH2, respectively, triggers the control circuit 360 to control the switch 330. More specifically, the control circuit 360 provides a control signal (labeled "QBAT_ON") to operate (e.g., close) the switch 330 to cause the battery 316 to deliver supplemental current to the second power supply rail VPH2 and the first power supply rail VPH1 (e.g., via the CP 380). In this manner of battery supplementing, the current from the battery 316 can compensate for, at least assist with, the load attack and therefore reduce an amount by which the voltage of the first power supply rail VPH1 falls below the first threshold voltage (e.g., the voltage at the first reference voltage node VREF1) due to the load attack and an amount by which the voltage of the second power supply rail VPH2 falls below the second threshold voltage (e.g., the voltage at the second reference voltage node VREF2) due to the load attack.

In some instances, the power supply circuit 400 may include a logic OR gate 430. The logic OR gate 430 may include a first input coupled to the output of the first comparator 410 and a second input coupled to the output of the second comparator 420. In this manner, the logic OR gate 430 may receive the first digital signal BSM1_TRIG and the second digital signal BSM2_TRIG from the first comparator 410 and the second comparator 420, respectively. When either the first digital signal BSM1_TRIG or the second digital signal BSM2_TRIG transitions from the first logic level (e.g., a zero) to the second logic level (e.g., a one), a third digital signal (labeled "TRIG") output by the logic OR gate changes from the first logic level to the second logic level.

In some instances, the power supply circuit 400 may include a latch circuit 440. As shown, the latch circuit 440 may be a set-reset (S-R) latch circuit that includes a first logic gate (labeled "SET") and a second logic gate (labeled "RESET"). When the logic level of the third digital signal TRIG output by the logic OR gate 430 transitions from the first logic level (e.g., a zero) to the second logic level (e.g., a one), a fourth digital signal (labeled "BSM_ON") output by the latch circuit 440 is set to the second logic level (e.g., a one). The fourth digital signal BSM_ON may cause the power supply circuit 400 to enter the battery supplemental mode. More specifically, the fourth digital signal BSM_ON may be provided to an input of the control circuit 360 and may cause the control circuit 360 to output the control signal QBAT_ON to operate the switch 330 to draw current from the battery 316 to supplement the current provided by the SMPS circuit 214 and compensate for, or at least assist with, the load attack.

In some instances, the power supply circuit 400 may include a third comparator "450" (labeled "QBAT_ISNS COMP). The third comparator 450 includes a first input (labeled "−") coupled to a reference current source (or an equivalent reference voltage node) and a second input (labeled "+") coupled to the battery node VBAT. A current (labeled "I_BSM_EXT") of the reference current source may correspond to a threshold current below which the battery 316 is not providing significant supplemental current and the power supply circuit 400 is not considered to be operating in the battery supplemental mode.

The third comparator 450 compares a current I_BAT from the battery 316 versus the threshold current I_BSM_EXT. If the current I_BAT falls below the threshold current I_BSM_EXT, a logic level of a fifth digital signal (labeled as "BSM_OFF") the third comparator 540 outputs to the latch circuit 440, specifically to an input of the second logic gate RESET thereof, transitions from the first logic level (e.g., a zero) to the second logic level (e.g., a one). The transition of the fifth digital signal BSM_OFF from the first logic level to the second logic level causes the latch circuit 440 to reset its output. The fourth digital signal BSM_ON transitioning from the second logic level (e.g., a one) to the first logic level (e.g., a zero) causes the power supply circuit 400 to cease operating in the battery supplemental mode. In this manner, the switch 330 may open and therefore break the electrical path between the battery node VBAT and the second power supply rail VPH2 such that the battery 316 can no longer deliver the current to the second power supply rail VPH2.

Figure 5:
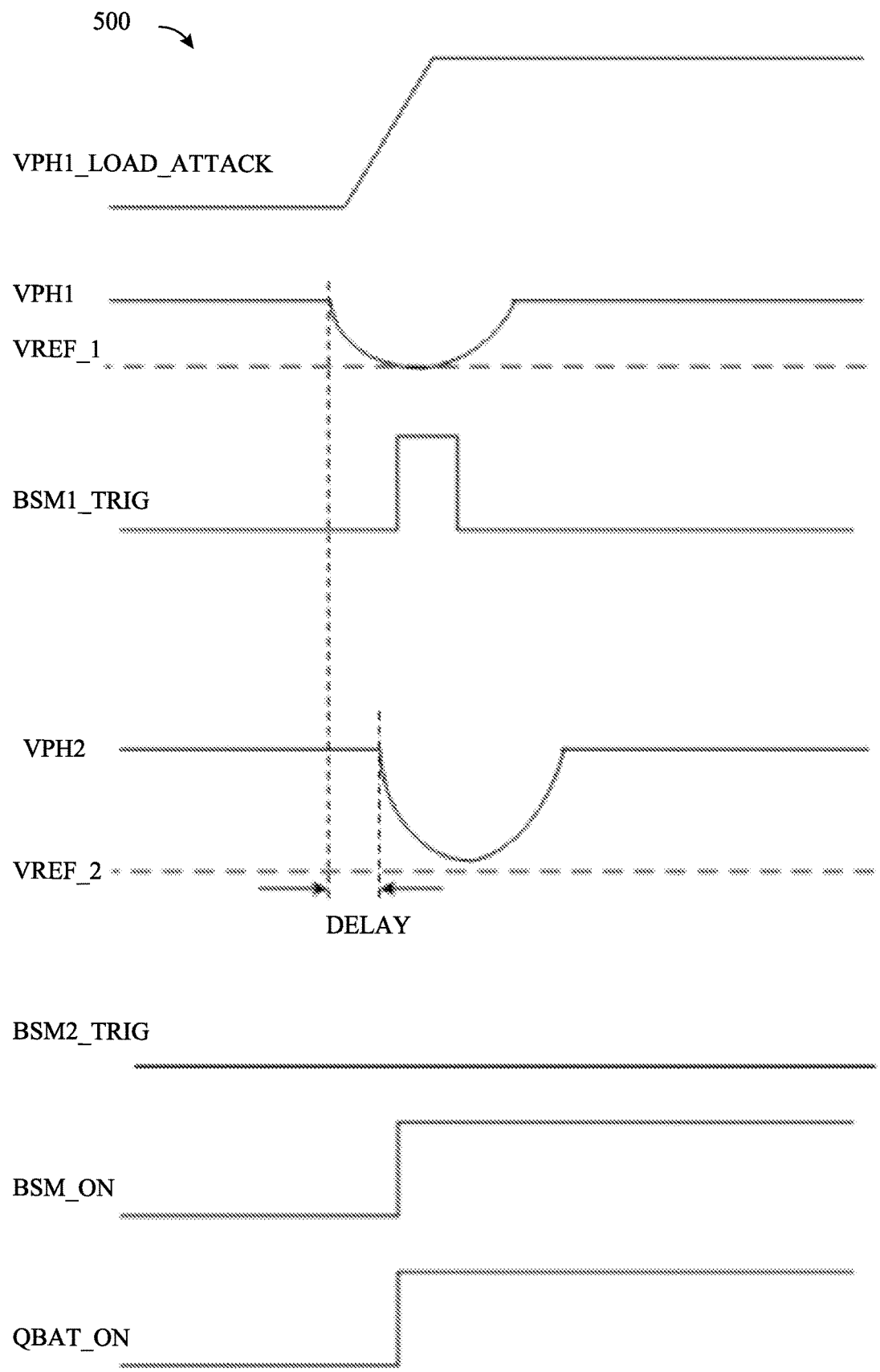
FIG. 5 is a timing diagram illustrating detection of a load attack on a power supply rail of a power supply circuit and entry of the power supply circuit into a battery supplemental mode to compensate for the load attack, in accordance with certain aspects of the present disclosure.

FIG. 5 is a timing diagram 500 illustrating detection and compensation for a load attack occurring on the first power supply rail VPH1 of the power supply circuit 400, in accordance with certain aspects of the present disclosure. As shown, a load attack on the first power supply rail VPH1 causes a voltage of the first power supply rail VPH1 to decrease. When the voltage of the first power supply rail VPH1 falls below (e.g., is less than) the voltage at the first reference voltage node VREF_1, the first digital signal BSM1_TRIG output by the comparator (e.g., first comparator 410 of FIG. 4) goes high (that is, transitions from logic level "zero" to logic level "one").

The first digital signal BSM1_TRIG going high causes the third digital signal TRIG (that is, the output of the logic OR gate 430 of FIG. 4) to go high which, in turn, causes the latch circuit 440 to set its output (that is, the fifth digital signal BSM_ON) to high (e.g., logic level one). The fifth digital signal BSM_ON going high causes the control signal QBAT_ON that the control circuit 360 outputs to the switch 330 to go high and therefore causes the switch 330 to close to draw current from the battery 316 to provide supplemental power and compensate for, or at least mitigate, the voltage dip on the first power supply rail VPH1. With the switch 330 closed, the voltage of the first power supply rail VPH1 increases such that the voltage of the first power supply rail VPH1 is once again above (e.g., greater than) the voltage at the first reference voltage node VREF_1.

The timing diagram 500 of FIG. 5 illustrates that a voltage of the second power supply rail VPH2 does not begin dropping (e.g., decreasing) at the same time as the voltage of the first power supply rail VPH1. This is due, in part, to a delay (e.g., labeled "DELAY") associated with the CP 380 that is coupled between the first power supply rail VPH1 and the second power supply rail VPH2. Furthermore, the timing diagram 500 illustrates that the second power supply rail VPH2 may not be significantly adversely affected (e.g., by the voltage at the second power supply rail VPH2 falling below the voltage at the second reference voltage node VREF_2) by the load attack on the first power supply rail VPH1. This is because the first comparator 410 detecting the voltage of the first power supply rail VPH1 falling below the voltage at the first reference voltage node VREF_1 causes the power supply circuit 400 to enter the battery supplemental mode to recover from the load attack on the first power supply rail VPH1 before the drop in the voltage of the second power supply rail VPH2 even triggers the second comparator 420. This is illustrated by the fact that the second digital signal BSM2_TRIG output by the second comparator 420 never goes high (e.g., transitions from logic level "zero" to logic level "one") during the load attack on the first power supply rail VPH1.

Example Operations for Supplying Power

Figure 6:
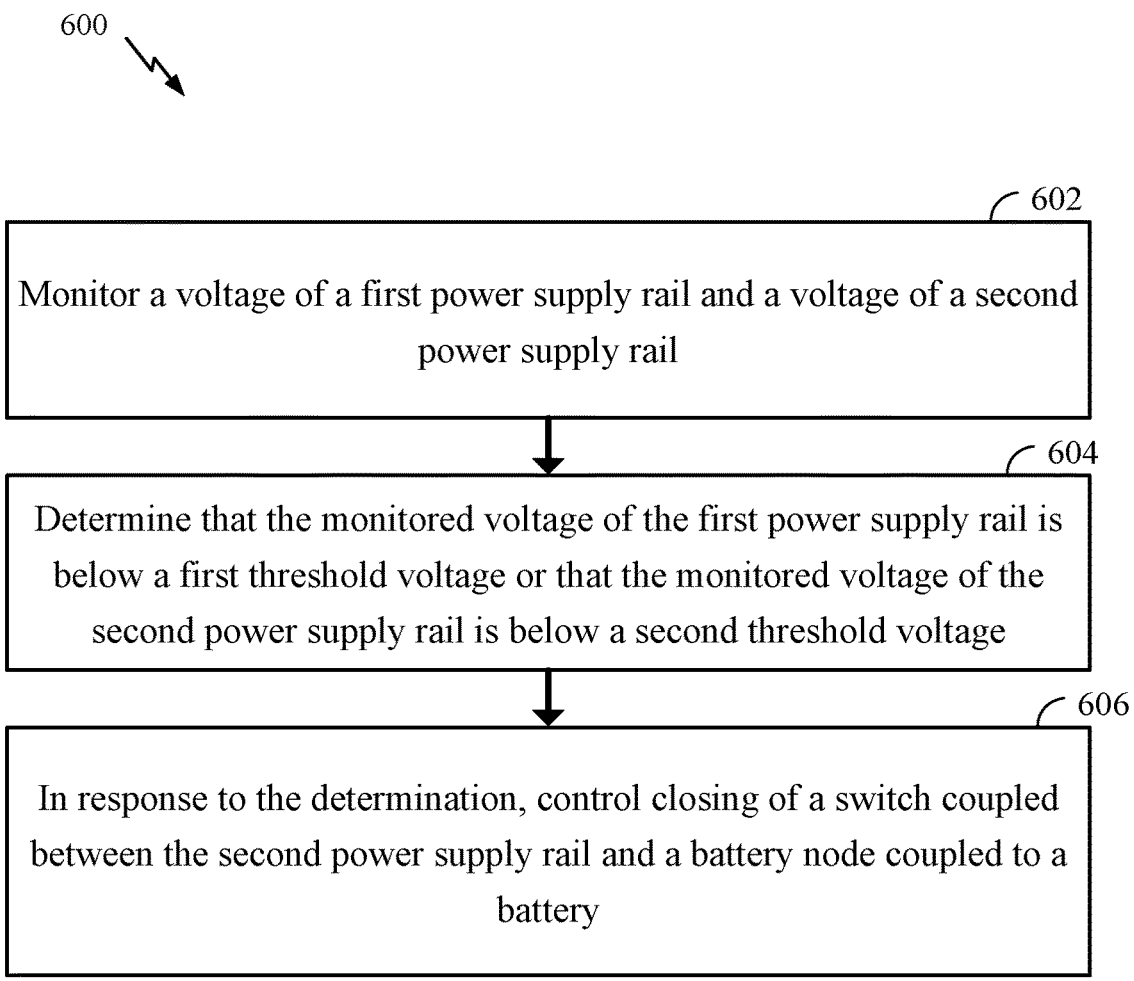
FIG. 6 is a flow diagram of example operations for supplying power, in accordance with certain aspects of the present disclosure.

FIG. 6 is a flow diagram of example operations 600 for supplying power, in accordance with certain aspects of the present disclosure. The operations 600 may be performed by a power supply circuit (e.g., the power supply circuit 400 of FIG. 4).

The operations 600 may begin, at block 602, with the power supply circuit monitoring a voltage of a first power supply rail (e.g., VPH1) and a voltage of a second power supply rail (e.g., VPH2). For example, the voltage of the first power supply rail may be monitored by a first comparator (e.g., first comparator 410), and the voltage of the second power supply rail may be monitored by a second comparator (e.g., second comparator 420).

At block 604, the power supply circuit may determine that the monitored voltage of the first power supply rail is below a first threshold voltage (e.g., VREF_1=0.5*VBAT−ΔV1) or that the monitored voltage of the second power supply rail is below a second threshold voltage (e.g., VREF_2=VBAT−ΔV2). Continuing the example above, the first comparator may detect that the monitored voltage of the first power supply rail is below the first threshold voltage or the second comparator may detect that the monitored voltage of the second power supply rail is below the second threshold voltage.

In response to the determination at block 604, the power supply circuit may, at block 606, control closing of a switch (e.g., switch 330) coupled between the second power supply rail and a battery node (e.g., battery node VBAT) coupled to a battery (e.g., battery 316). For example, controlling closing of the switch at block 606 may include applying a voltage to a gate (e.g., gate 346) of a first transistor (e.g., QBAT_A) of the switch and to a gate (e.g., gate 356) of a second transistor (e.g., QBAT_B) of the switch. The first transistor and the second transistor may be back-to-back transistors, where the first transistor includes a drain coupled to the second power supply rail and the second transistor includes a drain coupled to the battery and a source coupled to a source of the first transistor.

According to certain aspects, determining that the monitored voltage of the first power supply rail is below the first threshold voltage at block 604 involves comparing the voltage of the first power supply rail with a voltage at a first reference voltage node. In certain aspects, determining that the monitored voltage of the second power supply rail is below the second threshold voltage involves comparing the voltage of the second power supply rail with a voltage at a second reference voltage node. The voltage at the second reference voltage node may be different from the voltage at the first reference voltage node. According to certain aspects, the voltage at the first reference voltage node is one-half a battery voltage ($V_{BAT}$) of the battery minus a first voltage drop (e.g., 0.5*VBAT−ΔV1). In certain aspects, the voltage at the second reference voltage node is VBAT minus a second voltage drop (e.g., VBAT−ΔV2). In some cases, the second voltage drop may be larger than the first voltage drop.

According to certain aspects, the operations 600 may further include the power supply circuit monitoring a current through the switch (or a current from the battery) while the switch is closed. For example, a third comparator (e.g., third comparator 450) may monitor the current through the switch. The operations 600 may further include the power supply circuit determining that the current through the switch (or from the battery) falls below a threshold current (e.g., I_BSM_EXT). For example, the third comparator may compare the current through the switch to the threshold current to detect the current at the battery node has fallen below the threshold current. In response to the determination that the current through the switch (or from the battery) has fallen below the threshold current, the operations 600 may further include the power supply circuit controlling opening of the switch.

Example Aspects

In addition to the various aspects described above, specific combinations of aspects are within the scope of the disclosure, some of which are detailed below:

Aspect 1: A power supply circuit comprising: a switching regulator including an output coupled to a first power supply rail for coupling to a first load, the output being further coupled to a second power supply rail for coupling to a second load; a battery node for coupling to a battery; a switch coupled between the battery node and the second power supply rail; a control circuit including an output coupled to a control input of the switch; a first comparator including a first input coupled to the first power supply rail and a second input coupled to a first reference voltage node, the first comparator further including an output coupled to an input of the control circuit; and a second comparator including a first input coupled to the second power supply rail and a second input coupled to a second reference voltage node, the second comparator further including an output coupled to the input of the control circuit.

Aspect 2: The power supply circuit of Aspect 1, further comprising: a charge pump including a first terminal coupled to the first power supply rail and a second terminal coupled to the second power supply rail.

Aspect 3: The power supply circuit of Aspect 1 or 2, further comprising: a logic OR gate including a first input coupled to the output of the first comparator, a second input coupled to the output of the second comparator, and an output coupled to the input of the control circuit.

Aspect 4: The power supply circuit of Aspect 3, further comprising: a third comparator including a first input coupled to the battery node and a second input coupled to a reference current source.

Aspect 5: The power supply circuit of Aspect 4, further comprising: a latch circuit including a set input coupled to the output of the logic OR gate and a reset input coupled to an output of the third comparator, the latch circuit further including an output coupled to the input of the control circuit.

Aspect 6: The power supply circuit of Aspect 5, wherein: when a voltage at the second power supply rail is less than a voltage at the second reference voltage node, the second comparator is configured to output a logic signal to cause the control circuit to output a control signal to the control input of the switch to close the switch; and the voltage at the second reference voltage node is a battery voltage of the battery minus a voltage drop.

Aspect 7: The power supply circuit of Aspect 5, wherein when a voltage at the first power supply rail is less than a voltage at the first reference voltage node, the first comparator is configured to output a logic signal to cause the control circuit to output a control signal to the control input of the switch to close the switch.

Aspect 8: The power supply circuit of Aspect 7, wherein the voltage at the first reference voltage node is one-half of a battery voltage of the battery minus a voltage drop.

Aspect 9: The power supply circuit of any of Aspects 1 to 8, wherein the switch comprises: a first transistor including a drain coupled to the second power supply rail; and a second transistor including a source coupled to a source of the first transistor and a drain coupled to the battery node.

Aspect 10: The power supply circuit of any of Aspects 1 to 7 or 9, wherein: a voltage at the first reference voltage node is one-half a battery voltage ($V_{BAT}$) of the battery minus a first voltage drop; a voltage at the second reference voltage node is $V_{BAT}$ minus a second voltage drop; and the second voltage drop is larger than the first voltage drop.

Aspect 11: An integrated circuit comprising the power supply circuit of any of Aspects 1 to 10.

Aspect 12: A power supply circuit comprising: a switching regulator including an output coupled to a first power supply rail for coupling to a first load, the output being further coupled to a second power supply rail for coupling to a second load; a battery node for coupling to a battery; a switch coupled between the battery node and the second power supply rail; and a logic circuit including a first input coupled to the first power supply rail, a second input coupled to the second power supply rail, and an output coupled to a control input of the switch, the logic circuit being configured to control closing of the switch when a voltage of the first power supply rail falls below a first threshold voltage or when a voltage of the second power supply rail falls below a second threshold voltage.

Aspect 13: The power supply circuit of Aspect 12, further comprising: a charge pump including a first terminal coupled to the first power supply rail and a second terminal coupled to the second power supply rail.

Aspect 14: A method of supplying power comprising: monitoring a voltage of a first power supply rail and a voltage of a second power supply rail; determining that the monitored voltage of the first power supply rail is below a first threshold voltage or that the monitored voltage of the second power supply rail is below a second threshold voltage; and in response to the determination, controlling closing of a switch coupled between the second power supply rail and a battery node coupled to a battery.

Aspect 15: The method of Aspect 14, wherein at least one: determining that the monitored voltage of the first power supply rail is below the first threshold voltage comprises comparing the voltage of the first power supply rail with a voltage at a first reference voltage node; or determining that the monitored voltage of the second power supply rail is below the second threshold voltage comprises comparing the voltage of the second power supply rail with a voltage at a second reference voltage node, the voltage at the second reference voltage node being different from the voltage at the first reference voltage node.

Aspect 16: The method of Aspect 14 or 15, wherein the voltage at the first reference voltage node is one-half a battery voltage ($V_{BAT}$) of the battery minus a first voltage drop; the voltage at the second reference voltage node is $V_{BAT}$ minus a second voltage drop; and the second voltage drop is larger than the first voltage drop.

Aspect 17: The method of any of Aspects 14 to 16, wherein the controlling comprises applying a voltage to a gate of a first transistor of the switch and to a gate of a second transistor of the switch, the first transistor including a drain coupled to the second power supply rail and the second transistor including a drain coupled to the battery and a source coupled to a source of the first transistor.

Aspect 18: The method of any of Aspects 14 to 17, further comprising: monitoring a current through the switch while the switch is closed; determining that the monitored current through the switch is below a threshold current; and in response to the determination that the current is below the threshold current, controlling opening of the switch.

Aspect 19: The method of any of Aspects 14 to 18, further comprising: using a charge pump to at least assist generation of the voltage of the first power supply rail based on the voltage of the second power supply rail while the switch is closed.

Aspect 20: The method of any of Aspects 14 to 19, wherein the battery comprises a two-cell in-series battery.

Additional Considerations

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A power supply circuit comprising:
   a switching regulator including an output coupled to a first power supply rail for coupling to a first load, the output being further coupled to a second power supply rail for coupling to a second load;
   a battery node for coupling to a battery;
   a switch coupled between the battery node and the second power supply rail;
   a control circuit including an output coupled to a control input of the switch;
   a first comparator including a first input coupled to the first power supply rail and a second input coupled to a first reference voltage node, the first comparator further including an output coupled to an input of the control circuit; and
   a second comparator including a first input coupled to the second power supply rail and a second input coupled to a second reference voltage node, the second comparator further including an output coupled to the input of the control circuit.

2. The power supply circuit of claim 1, further comprising:
   a charge pump including a first terminal coupled to the first power supply rail and a second terminal coupled to the second power supply rail.

3. The power supply circuit of claim 1, further comprising:
   a logic OR gate including a first input coupled to the output of the first comparator, a second input coupled to the output of the second comparator, and an output coupled to the input of the control circuit.

4. The power supply circuit of claim 3, further comprising:
   a third comparator including a first input coupled to the battery node and a second input coupled to a reference current source.

5. The power supply circuit of claim 4, further comprising:
   a latch circuit including a set input coupled to the output of the logic OR gate and a reset input coupled to an output of the third comparator, the latch circuit further including an output coupled to the input of the control circuit.

6. The power supply circuit of claim 5, wherein:
   when a voltage at the second power supply rail is less than a voltage at the second reference voltage node, the second comparator is configured to output a logic signal to cause the control circuit to output a control signal to the control input of the switch to close the switch; and
   the voltage at the second reference voltage node is a battery voltage of the battery minus a voltage drop.

7. The power supply circuit of claim 5, wherein when a voltage at the first power supply rail is less than a voltage at the first reference voltage node, the first comparator is configured to output a logic signal to cause the control circuit to output a control signal to the control input of the switch to close the switch.

8. The power supply circuit of claim 7, wherein the voltage at the first reference voltage node is one-half of a battery voltage of the battery minus a voltage drop.

9. The power supply circuit of claim 1, wherein the switch comprises:
   a first transistor including a drain coupled to the second power supply rail; and
   a second transistor including a source coupled to a source of the first transistor and a drain coupled to the battery node.

10. The power supply circuit of claim 1, wherein:
    a voltage at the first reference voltage node is one-half a battery voltage (VBAT) of the battery minus a first voltage drop;
    a voltage at the second reference voltage node is VBAT minus a second voltage drop; and
    the second voltage drop is larger than the first voltage drop.

11. An integrated circuit comprising the power supply circuit of claim 1.

12. A power supply circuit comprising:
    a switching regulator including an output coupled to a first power supply rail for coupling to a first load, the output being further coupled to a second power supply rail for coupling to a second load;
    a charge pump including a first terminal coupled to the first power supply rail and a second terminal coupled to the second power supply rail;
    a battery node for coupling to a battery;

a switch coupled between the battery node and the second power supply rail; and a logic circuit including a first input coupled to the first power supply rail, a second input coupled to the second power supply rail, and an output coupled to a control input of the switch, the logic circuit being configured to control closing of the switch when a voltage of the first power supply rail falls below a first threshold voltage or when a voltage of the second power supply rail falls below a second threshold voltage.

13. A method of supplying power, comprising:

monitoring a voltage of a first power supply rail and a voltage of a second power supply rail;

determining that the monitored voltage of the first power supply rail is below a first threshold voltage or that the monitored voltage of the second power supply rail is below a second threshold voltage;

in response to the determination, controlling closing of a switch coupled between the second power supply rail and a battery node coupled to a battery;

monitoring a current through the switch while the switch is closed;

determining that the monitored current through the switch is below a threshold current; and in response to the determination that the current is below the threshold current, controlling opening of the switch.

14. The method of claim 13, wherein at least one of:

determining that the monitored voltage of the first power supply rail is below the first threshold voltage comprises comparing the voltage of the first power supply rail with a voltage at a first reference voltage node; or determining that the monitored voltage of the second power supply rail is below the second threshold voltage comprises comparing the voltage of the second power supply rail with a voltage at a second reference voltage node, the voltage at the second reference voltage node being different from the voltage at the first reference voltage node.

15. The method of claim 14, wherein:

the voltage at the first reference voltage node is one-half a battery voltage (VBAT) of the battery minus a first voltage drop;

the voltage at the second reference voltage node is VBAT minus a second voltage drop; and the second voltage drop is larger than the first voltage drop.

16. The method of claim 13, wherein the controlling comprises applying a voltage to a gate of a first transistor of the switch and to a gate of a second transistor of the switch, the first transistor including a drain coupled to the second power supply rail and the second transistor including a drain coupled to the battery and a source coupled to a source of the first transistor.

17. The method of claim 13, further comprising using a charge pump to at least assist generation of the voltage of the first power supply rail based on the voltage of the second power supply rail while the switch is closed.

18. The method of claim 13, wherein the battery comprises a two-cell-in-series battery.

* * * * *